United States Patent [19]
Gruss et al.

[11] 4,317,150
[45] Feb. 23, 1982

[54] FOIL RECORDING DISK STRUCTURES

[75] Inventors: Edward G. Gruss, Campbell; Armin R. Tietze, San Jose, both of Calif.

[73] Assignee: International Business Machines Corporation, Armonk, N.Y.

[21] Appl. No.: 102,166

[22] Filed: Dec. 10, 1979

[51] Int. Cl.³ .................. G11B 5/82; G11B 5/016
[52] U.S. Cl. .................................... 360/135; 360/99
[58] Field of Search .................. 360/135, 98–99, 360/132, 131, 86; 346/137

[56] References Cited

U.S. PATENT DOCUMENTS 3,336,583  8/1967  Comstock .................... 360/135
3,359,549 12/1967  Farrand et al.
3,373,413  3/1968  Treseder
3,480,964 11/1969  Siler
3,537,083 10/1970  Voth
3,599,226  8/1971  Lips

FOREIGN PATENT DOCUMENTS 1005103  9/1965  United Kingdom .............. 360/135

OTHER PUBLICATIONS

IBM Tech. Disc. Bull., A. W. Orlando, Large Bulk Storage Memory, vol. 17, No. 1, Jun. 1974, p. 322.

Primary Examiner—Alfred H. Eddleman
Attorney, Agent, or Firm—Walter J. Madden, Jr.

[57] ABSTRACT

A magnetic recording device employing one or more thin circular foil members which are secured to a supporting member on at least the outer edges of the foil members. In one embodiment, the foil members have central openings therein, with the central opening in one foil member being larger than the opening in the other foil member. A clamping and spacing member is secured to the foil member having the smaller opening and extends through the larger opening in the other foil member to both provide a means for transmitting rotational force to the structure and to provide for spacing between the structure and an adjacent structure in a recording assembly.

In an alternate embodiment, one of the foil members has a central opening while the other does not, and rotational force is transmitted through the foil without the central opening. As additional alternatives, the foils may have central openings of equal sizes and be secured to support members either at their outer edges or at both their inner and outer edges.

7 Claims, 10 Drawing Figures

FOIL RECORDING DISK STRUCTURES

DESCRIPTION

1. Technical Field

This invention relates in general to magnetic recording disks, and relates more particularly to magnetic disks in the form of foils.

2. Background Art

In magnetic recording, the use of disks having either particulate or thin film magnetic coatings thereon is well known. Each of these types of coatings has problems associated therewith which render them less than totally desirable, particularly for extremely thin coatings which are required for the high bit density recording patterns being used now and in the future.

Particulate coatings on aluminum substrates, especially in extremely thin layers, often exhibit limited durability with respect to contact with the magnetic transducer associated with the disk. Thin film disks, usually produced by sputtering, evaporation or electroplating of a magnetic coating, generally provide magnetic coatings which are thinner than those available with particulate coatings. However, thin film disks often exhibit significant corrosion problems, primarily because of the reaction between the metal substrate, which has been required to be aluminum because of weight considerations, and the deposited thin film layer, and have required the deposition of protective layers between the substrate and the thin film layer and over the thin film layer. Understandably, the requirement for these protective layers has added significantly to the cost of the thin film disk.

Additionally, both particulate and thin film disks usually have employed a substrate of substantial thickness relative to the coating thickness, thereby adding appreciably to the weight of an assembly which includes several of such disks.

Recording disks of the foil type have been proposed in the past for magnetic recording. Usually such disks have been formed of a plastic substrate coated with magnetic material and arranged to provide some type of compliant surface for interacting with the magnetic transducer.

PRIOR ART

U.S. Pat. No. 3,373,413 (Treseder), discloses a magnetic recording disk in which a plastic foil member is stretched over a mounting ring by the application of force to its outer edge and is then clamped to the ring to produce a compliant recording surface.

U.S. Pat. No. 3,599,226, (Lips) discloses a magnetic recording device formed of two spaced foil members arranged so that air may flow between the foils as they rotate to urge the foil surfaces against their associated recording heads.

U.S. Pat. No. 3,537,083 (Voth) shows a magnetic recording device employing a flexible disk mounted on a base having a cavity therein to permit controlled air pressure to be applied to the disk for varying its tension.

U.S. Pat. No. 3,480,964 (Siler) discloses a magnetic recording device in which the disks are secured to an enclosure by means of a hardenable material inserted into grooves extending around the disks.

U.S. Pat. No. 3,359,549 (Farrand et al) shows a magnetic recording device employing thin metal or plastic disks which are tensioned and supported at their periphery and to which access is had by transducers mounted in the central openings of the disks.

THE INVENTION

In accordance with the present invention, a magnetic recording foil is formed of a thin, corrosion resistant metallic material having a coating of magnetic material on one or both surfaces. This magnetic coating may be either particulate such as disclosed in U.S. Pat. No. 3,058,844, or thin film. The foil structure may be formed in a number of ways. For example, a foil member may be tensioned by stretching or heating and joined to a support member. Alternatively, the foil structure is formed by securing its outer edge around the circumference of a ring member which is radially compressed. After securing the edge of the foil member to the compressed ring, the compression of the ring is released to allow the ring to expand radially. This expansion produces tension in the attached foil member to produce a recording surface which is not subject to rippling, bending or other undesirable effects sometimes associated with foil recording disks.

In one embodiment of the invention, a foil is mounted on a ring in the above manner and is provided with one surface for magnetic recording. Alternatively, both foil surfaces may have magnetic recording material applied thereto. In another embodiment, two foil members are provided with each ring, one attached to the upper surface of the ring and the other to the lower surface. Both sides of each foil are provided with magnetic recording coatings and by providing a central opening in each foil for an access mechanism carrying one or more magnetic transducers, access may be had to information recorded on any of the four recording surfaces of the two foils. Alternatively, only the upper surface of one foil and the lower surface of the other foil is provided with a magnetic coating, and access to these two recording surfaces is had by transducers movable from the outside diameter of the disk toward the inside diameter.

The foil/ring recording members described may be incorporated into a recording assembly comprised of a plurality of such foil/ring members vertically spaced from each other and serviced by a common access mechanism either through the central openings in the foils or from the outside diameters of the structure.

Recording devices constructed in accordance with this invention provide a number of advantages over other devices. By use of thin film magnetic coatings, extremely high bit densities are obtainable, yet the problems of corrosion are eliminated by the use of a corrosion-resistant material for the foil material and by the fact that no corrosion-prone metal substrate is required. Further, because of the thin foils used, the resulting structure is extremely light, even when a number of such foil/ring members are used in a recording assembly, and the recording disk is very durable because of its hardness and the flexibility of the foil. Additionally, devices of the present invention are lower in cost than particulate or thin film disks on aluminum substrates because there is no requirement for expensive grinding or diamond turning of a substrate, and no need for the application of protective corrosion-resistant coatings. A further factor which reduces the cost of the present devices is the ability to fabricate the recording members of this invention, including application of the magnetic coating, in a continuous process.

DESCRIPTION OF THE BEST MODE AND INDUSTRIAL APPLICABILITY

Figure 1:
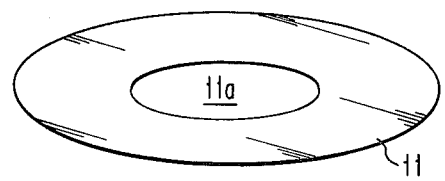
FIG. 1 is a perspective view of a foil member suitable for use in the present invention.

Referring to FIG. 1, there is shown a foil member 11 of a configuration suitable for use in the present invention. Foil 11 is circular in shape and is provided with a central opening 11a. Foil 11 is made of a suitable corrosion-resistant material such as stainless steel, inconel or nitronic foil and preferably has a thickness in the order of 4.0 mils. The material of foil 11 preferably has a yield strength in excess of 100,000 psi. Foil 11 may have applied thereto a magnetic coating prior to being mounted, or such coating may be applied to the foil after fabrication of the recording structure.

Figure 2:
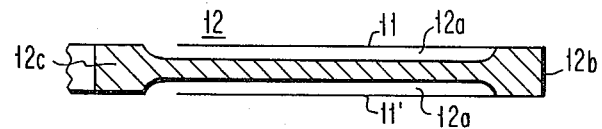
FIGS. 2 and 3 are cross sectional views of recording structures in accordance with this invention.

Foil 11 may be mounted on a suitable support member 12 to form a recording structure. Prior to joining foil 11 to member 12, the foil may be tensioned by suitable means such as stretching or heating. Alternatively or in combination with this foil tensioning, support member 12 may be contracted by cooling prior to joining foil 11 thereto. In FIG. 2, support member 12 may be in the form of a flat member having portions thereof removed in the regions 12a by machining or the like, leaving a thicker portion 12b at the outside diameter and a thicker portion 12c at the inside diameter. Foil 11 is secured to portion 12b by welding, spot welding, laser welding, ultrasonic bonding, chemical bonding, or fusion. Foil 11 is thus supported at its periphery on the outside diameter of member 12, leaving foil 11 suspended in tension above the portion 12a of member 12 which has a reduced thickness.

If desired, a similar tensioned foil 11' may be secured to the bottom of portion 12b of member 12, as shown in FIG. 2, to produce a recording structure having two recording surfaces represented by foil members 11 and 11'. In the structure of FIG. 2, inner portion 12c does not support foils 11, 11', and its primary purpose is to provide support for clamping the structure in a recording assembly.

Figure 3:
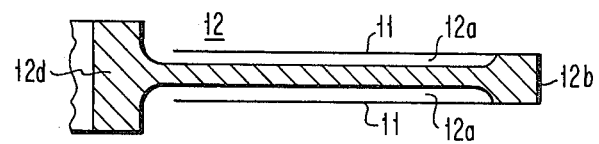

FIG. 3 illustrates an alternate embodiment of the invention using a member 12 having portions of reduced thickness 12a and an outside diameter portion 12b, as in FIG. 2. However, the inner diameter portion 12d of member 12 is thicker than outer diameter portion 12b, and the function of this thicker portion 12d is to serve as a clamping structure and as an integral spacer to properly separate the recording structures when a plurality of them are assembled one above the other in a recording device.

Figure 4:
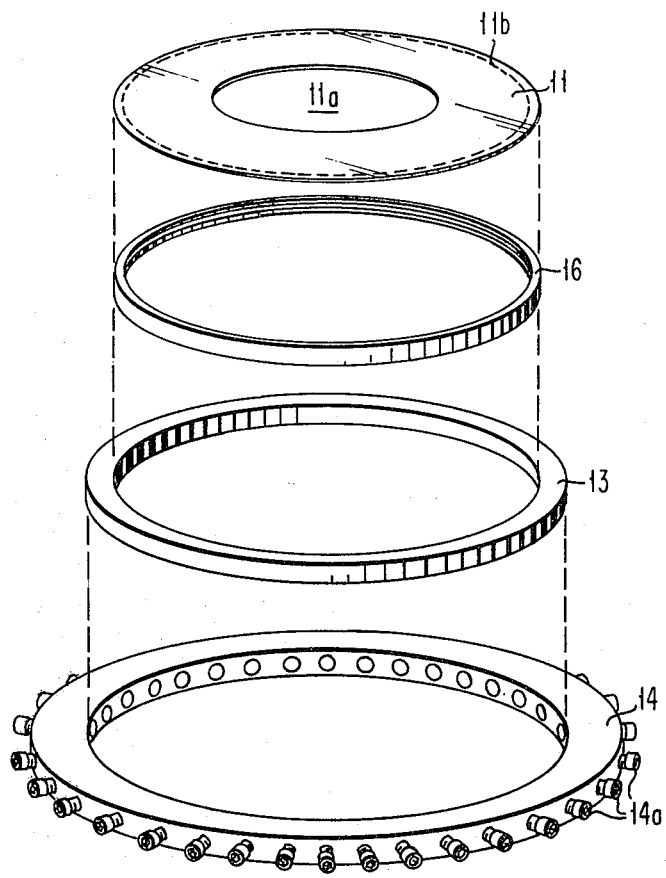
FIG. 4 is an exploded view illustrating the preferred method of fabrication of the recording structure of this invention.

FIG. 4 illustrates an alternate foil recording structure and a method for facricating such a structure. The fabrication method to be described is claimed in copending applicaton Ser. No. 102,161, filed Dec. 10, 1979, and assigned to the same assignee as the present application.

For fabrication in accordance with this method, foil 11 is placed on a ring 16 which is radially compressible. Ring 16 is preferably, although not necessarily, made of the same material as foil 11 so as to provide compatibility for welding of the foil to the ring, and common thermal coefficients of expansion, corrosion resistance and high yield and structural strength. Ring 16 is radially compressible by suitable means such as a compression ring 13 inside which ring 16 is adapted to fit and which is compressed by a compression ring 14 which fits around ring 13. Ring 14 may provide compressive force by means of a plurality of screws 14a uniformly spaced around the periphery of ring 14 and threadable through openings therein to provide compressive pressure at a plurality of points on the outside of ring 13. As screws 14a are tightened, the compressive pressure from these screws on ring 13 is transformed into a uniform radial compressive pressure of ring 13 on ring 16, thereby uniformly compressing ring 16. After the desired degree of compression of ring 16 has been produced by tightening of screws 14a, foil 11 is placed on ring 16 and secured thereto by suitable means such as welding, spot welding, laser welding, ultrasonic bonding or fusion, as represented by dashed line 11b. Preferably, during fastening of foil 11 to ring 12, foil 11 is essentially tension-free.

Screws 14a may then be withdrawn from ring 14 to release the pressure on ring 13 and hence on ring 16. Ring 16 thereupon expands toward its original size, thereby elongating and tensioning foil 11. Preferably, the amount of elastic elongation of foil 11 is sufficient to result in a recording structure having high impact and damage resistance and low microcreep.

If desired, the recording structure formed as described above may be used by arranging to rotate the structure, preferably by driving it by means of ring 16, past an associated transducer mechanism for recording on and reproducing from the magnetic coating on foil 11. Such transducer mechanism may be disposed in the space formed by the opening 11a of foil 11 so as to access the recording surface from the inside diameter of the disk.

Figure 5:
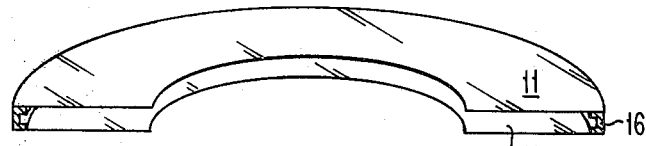
FIG. 5 is a perspective view in cross-section illustrating a recording structure of this invention.

In an alternate embodiment illustrated in FIG. 5, a foil member is provided on both the top and bottom surfaces of ring 16. These foil members, identified in FIG. 5 as 11 and 11', may be mounted on ring 16 as described above, by radially compressing ring 16, securing foil members 11 and 11' thereto at the periphery of the foils, and releasing the compression of ring 16 to tension foil members 11 and 11'. By providing magnetic coatings on both the top and bottom surfaces of foils 11, 11', a total of four recording surfaces are available from the two foil members, and these four surfaces may be accessed by an access mechanism disposed in the space formed by openings 11a, 11'a, as shown in FIG. 6.

Figure 6:
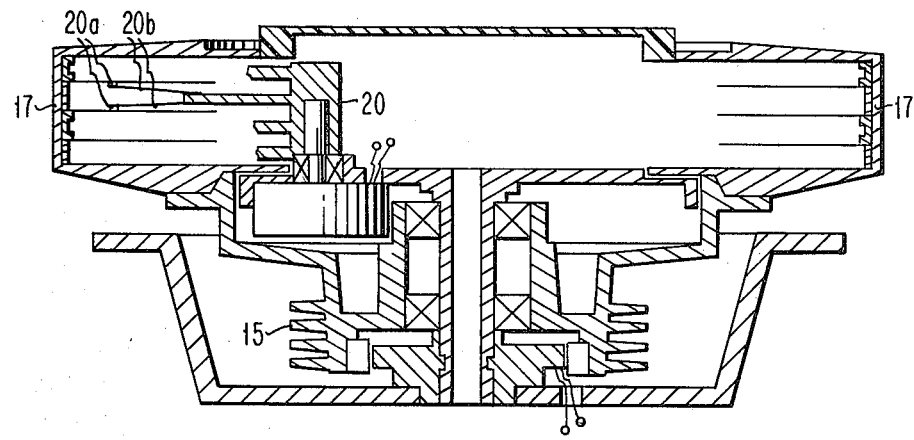
FIG. 6 is a cross-sectional schematic representation of a recording assembly using a plurality of the structures of FIG. 5.

FIG. 6 illustrates how the structure shown in FIG. 5 may be utilized in a magnetic recording assembly. A plurality of the structures are mounted in an enclosure having a wall 17 to which the recording structures are secured. A motor 15 is connected to wall 17 to rotate it and the connected recording structures. A rotary actuator mechanism 20 is mounted in the space represented by openings 11a, 11'a of the foil members and carries a plurality of transducers 20a on arms 20b, one of which is associated with each of the recording surfaces of foil members 11, 11'. Rotary motion of actuator 20 causes transducers 20a to be located adjacent different tracks on the recording surfaces for recording or reproducing information.

Figure 7:
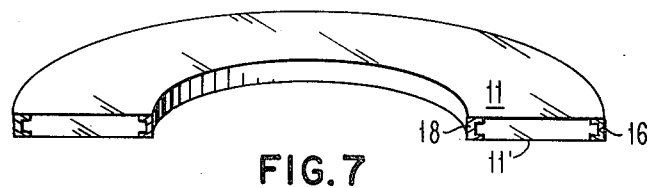
FIG. 7 is a cross-sectional representation of an alternate embodiment of the invention employing rings at both the inner and outer diameters of the foil members.

FIG. 7 illustrates an alternate embodiment of the invention in which both an outside diameter ring 16 is employed, as before, and an inside diameter ring 18 is also used. The structure is fabricated as before by radially compressing ring 16 to the desired extent. Foil members 11, 11' are then secured to the outer edges of both rings 16 and 18 to thus secure the foil members at both their outside and inside diameters. The compression of ring 16 is then released to tension the foil members as before. It will be understood from FIG. 7 that with the use of both inner ring 18 and outer ring 16, only the top surface of foil member 11 and the bottom surface of member 11' will be usable for magnetic recording.

Figure 8:
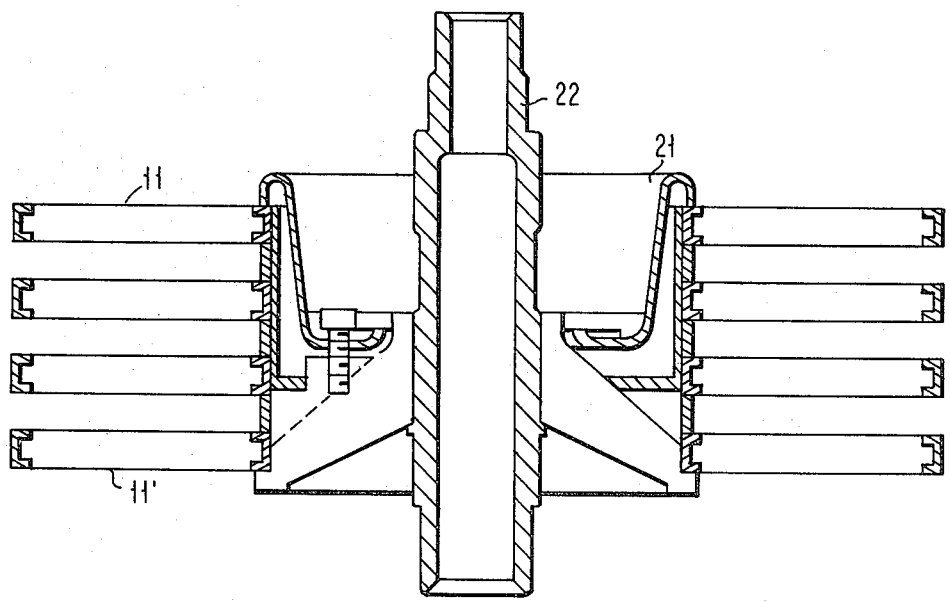
FIG. 8 is a cross-sectional schematic representation of a recording assembly using a plurality of the structures of FIG. 4.

FIG. 8 illustrates how the structure shown in FIG. 7 may be assembled into a magnetic recording assembly. A plurality of the structures of FIG. 7, including foil members 11, 11', outer ring 16 and inner ring 18 are mounted in spaced relation on a clamping mechanism 21 which in turn is connected to a rotatable shaft 22. As shaft 22 rotates, the recording assemblies also rotate and may be accessed by one or more access mechanisms moving between the recording assemblies from their outside diameter.

Figure 9:
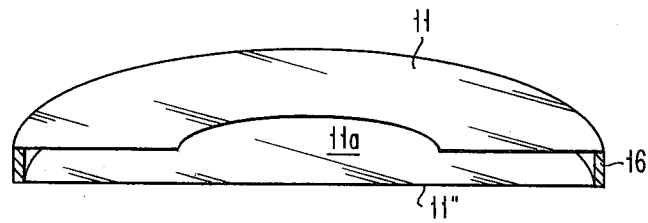
FIG. 9 is a perspective view partly in cross-section, illustrating an alternate embodiment of the invention utilizing a foil member with a central opening and a foil member without such an opening.

FIG. 9 illustrates another embodiment including a foil member 11 having a central opening 11a therein and secured at its outer diameter to ring member 16. The bottom foil member 11" is not provided with a central opening, but instead is a solid foil member secured at its periphery to the lower surface of ring 16. One or both surfaces of foil members 11, 11" may be provided with magnetic recording surfaces, as described above. Foil member 11" may be attached to a spindle or other source of rotation to provide a means to couple the recording structure for rotation. The structure of FIG. 9 could represent the bottom element of a recording structure, with additional structures such as shown in FIG. 5 mounted above it, with suitable spacing members separating the different recording structures.

Figure 10:
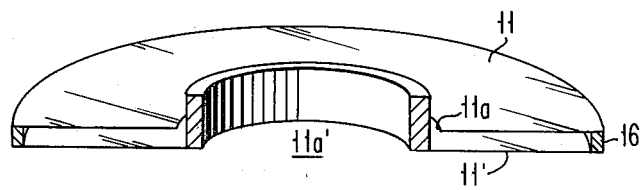
FIG. 10 illustrates a further embodiment of the invention in which the two foil members have central openings of different diameters and the structure is provided with a combined clamping and spacing element.

FIG. 10 shows an additional embodiment of the invention employing an upper foil member 11 secured at its periphery to ring 16 and having a central opening 11a. Lower foil member 11' has a central opening 11a' which is smaller in diameter than opening 11a in foil member 11. A combined clamping ring and spacing member 11c may be secured to lower foil member and extend up through opening 11a in foil member 11. Member 11c thus provides the dual function of clamping the recording structure for the transmission of rotational force thereto and acting as a spacer member to separate the recording structure shown in FIG. 10 from an adjacent structure in a recording assembly.

We claim:
1. A magnetic recording structure, comprising
    a cylindrical support member,
    a pair of circular tensioned metal magnetic foil members secured on opposite sides of said support member, said foil members having central openings therein, said foil members being secured to said support member only at their periphery and being spaced from the remainder of said support member,
    said support member being a generally cylindrical element having recessed portions on both of its surfaces inwardly of the periphery, said foil members being secured at their periphery to the periphery of said support member and being spaced from said recessed portions; and
    means for rotating said recording structure past an associated magnetic transducing assembly.

2. A magnetic recording structure, comprising a cylindrical support member,
    a pair of circular tensioned metal magnetic foil members secured on opposite sides of said support member, said foil members having central openings therein, said foil members being secured to said support member only at their periphery and being spaced from the remainder of said support member,
    said support member being a generally cylindrical element having recessed portions on both of its surfaces inwardly of the periphery, said foil members being secured at their periphery to the periphery of said support member and being spaced from said recessed portions,
    said support member having a raised portion at its inner diameter spaced from said openings in said foil members and extending in both directions through said openings to serve as a spacer element; and
    means for rotating said recording structure past an associated magnetic transducing assembly.

3. A magnetic recording structure comprising
    a ring member,
    a pair of circular foil members secured on opposite sides of the periphery of said ring member, at least one of the surfaces of said foil members having magnetic coatings thereon, at least one of said foil members having a central opening therein,
    both of said foil members having central openings therein, the diameter of one of said central openings being larger than the diameter of the other opening; and
    means for rotating said structure past an associated magnetic transducer means.

4. Apparatus in accordance with claim 3, in which only one of said foil members has a central opening therein.

5. Apparatus in accordance with claim 3, including a clamping and spacing member secured to said foil member having the smaller diameter and extending through the opening in said other foil member to provide a clamping and spacing member.

6. Apparatus in accordance with claim 3, including a second ring member concentric with said first ring member and having a diameter less than the diameter of the first ring member, and
    means for securing said foil members to said second ring member.

7. Apparatus in accordance with claim 6, including a plurality of such structures spaced from each other to provide a multi-surface recording structure.

* * * * *